United States Patent [19]
Miller

[11] 3,744,609
[45] July 10, 1973

[54] SELF-ADJUSTING TWO-WAY ELECTROMAGNETIC DISC CLUTCH

[75] Inventor: Donald L. Miller, Horseheads, N.Y.

[73] Assignee: The Bendix Corporation, Southfield, Mich.

[22] Filed: Mar. 31, 1971

[21] Appl. No.: 129,741

[52] U.S. Cl............ 192/111 A, 192/35, 192/84 A, 188/71.8
[51] Int. Cl............................................. F16d 13/60
[58] Field of Search............ 192/84 R, 84 A, 111 A, 192/111 B, 54, 18 B, 35; 188/71.8

[56] References Cited
UNITED STATES PATENTS

| | | | |
|---|---|---|---|
| 2,481,028 | 9/1949 | Lear | 192/18 B |
| 2,392,572 | 1/1946 | Briggs et al. | 192/54 |
| 3,168,175 | 2/1965 | Straub et al. | 192/111 A |
| 2,692,035 | 10/1954 | Rabinow | 192/84 R |

*Primary Examiner*—Charles J. Myhre
*Assistant Examiner*—Randall Heald
*Attorney*—Bruce A. Yungman and Plante, Hartz, Smith & Thompson

[57] ABSTRACT

A two-way electromagnetic clutch with wear compensating means operative in either direction of rotation having two sets of coacting friction discs adapted for releasably coupling a driving and driven rotary component. When the clutch is energized, the armature, which is not in the drive train, contactively engages with the pole faces of the electromagnet causing the freely mounted armature to rotate with the driving member. An annular pressure plate member which is slidably splined to the driven rotary component and slidably mounted to the armature by suitable cam means for relative axial and rotational movement therewith, applies the necessary engagement pressure to the friction disc assembly causing torque to be transmitted from the driving to the driven rotary component. The pressure plate has symetrical V-shaped recesses therein which coact with cam-like projections of the armature to automatically take up any lost motion occasioned by wear of the friction discs for either direction of rotation of the clutch; thus, the desired disc engagement pressure and the electromagnetic engaging force are held constant for the life of the clutch.

7 Claims, 1 Drawing Figure

PATENTED JUL 10 1973 3,744,609
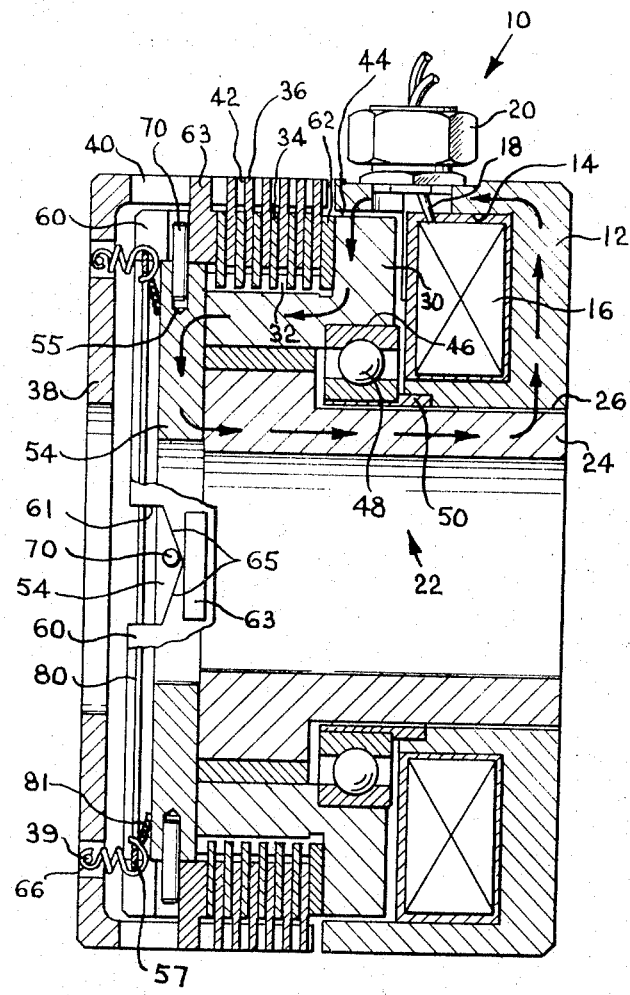
DONALD L. MILLER
INVENTOR.
BY [signature]

SELF-ADJUSTING TWO-WAY ELECTROMAGNETIC DISC CLUTCH

FIELD OF THE INVENTION

This invention relates to electrically operated friction devices and controls therefor and more particularly to a bidirectional electromagnetic two-way self-adjusting disc clutch.

BRIEF DESCRIPTION OF THE PRIOR ART

Clutches and brakes as now constructed must be taken out of operation and serviced when it is necessary to adjust the same to compensate for wear of the friction surfaces or shoes. This procedure is expensive and troublesome. In order to avoid the need for frequent adjustment, the throw or relative movement of the main parts of the clutch or brake is sometimes made substantial. This is undesirable for mechanical reasons, and slows the operation or response of the clutch or brake. A large throw is particularly undesirable when the clutch is of the magnetic type, for a greatly increased magnetic excitation is required when a substantial spacing or throw is provided.

In prior magnetic clutches, at least two methods have been employed to allow for wear of the clutch facings. One is to use a very large magnetic gap so that wear does not make an appreciable difference in the gap lengths. The other is to let the magnetic surfaces touch each other and to let the iron wear with the friction surfaces. In the first approach, the reluctance changes with wear, which is highly undesirable since the same excitation results in different amounts of pull (and, therefore, torque). In the second method, relining is difficult and steel is very poor friction material when used against steel. Further, when the armature is used as a torque transmitting member, the reluctance between the magnetic pole faces and the armature changes as the friction surfaces become porous and worn.

Self-adjusting clutches are well known in the art, however, in most of these devices, the adjusting occurs when the operating "throw" exceeds a predetermined value. That is, for the adjustment to take effect, the clutch or brake must be released and re-engaged. In no previous device of this type has an efficient and inexpensive automatic adjustment been provided for if the machinery remained continuously in the energized condition.

Some prior art designs have attempted to automatically self-adjust for wear of the frictional surfaces without requiring the clutch to release and to be re-engaged. However, these clutches, in effect, adjusted the disengaged spacing between the friction surfaces in order to compensate for wear; that is, no adjustment occurred in these devices until the main friction surfaces wore to the extent necessary to actuate the self-adjusting mechanism. Thus, by their very nature, these clutches do not maintain a constant pressure on the disc pack since the magnetic engaging force varied over the life of the clutch. As far as I have been able to determine, no bidirectional clutch is known in the art that teaches a zero air gap condition from its first engagement throughout the life of the clutch so that the engagement pressures and forces are always the same.

It has also been noted that none of the prior art designs showed an inexpensive wear compensating mechanism that would maintain the necessary automatic adjustment for a bidirectional clutch.

Other prior art designs are known wherein cam-like apparatus was used to apply engaging force to the disc pack. One such device used balls in a plate having inclined shaped pockets. When the armature was engaged the ball plate rotated causing the balls to move up the incline. Because of the mechanical advantage of the incline pockets, the force applied to the disc pack was much greater than could be obtained from the armature alone. The serious operating flaw in this design as with most self-energizing devices, was that the torque varied with speed. At high speed the torque would often become so high that the clutch would jam up and not release. On the other hand at very low speeds, the clutch might never reach the design torque.

SUMMARY OF THE PRESENT INVENTION

This invention is an electromagnetic clutch apparatus for torque transmission having driving means, driven means, clutch actuating means including an electromagnetic winding, a friction disc assembly which includes two sets of coacting friction discs adapted for releasably coupling the driving and driven means, an annular pressure plate slidably splined to the driven means and operative to provide a constant engagement pressure on said friction disc assembly, a disc-shaped armature connected by cam means to the pressure plate and operative to contactively engage with said driving means in response to the actuating means. The pressure plate has symetrical V-shaped recesses therein which coactively receive cam-like projections of the armature thus providing wear compensating adjustment for either direction of rotation of the clutch. Detent means is also provided to prevent false adjustment caused by sudden stops and starts and to maintain the adjusted position of the pressure plate relative to the armature when the clutch is disengaged.

It is, therefore, an object of this invention to provide an improved inexpensive, efficient, self-adjusting electromagnetic friction device.

It is another object of this invention to provide a self-adjusting electromagnetic clutch in which automatic adjustment is made independently of whether the clutch is periodically released and engaged or whether it remains engaged permanently at full torque.

It is still another object of this invention to provide a self-adjusting wear compensating clutch which continuously adjusts for wear in the disc pack. Pursuant to this object, excessive wear in the disc pack is not necessary before the self-adjusting mechanism is activated, since the pressure on the friction discs is kept constant throughout the life of the clutch.

It is still a further object of this invention to provide an electromagnetic clutch which minimizes the reluctance in the flux path linkage by providing an armature which is not the principal torque carrying member and which is not in the drive train. That is, the flat smooth contactive relationship between the armature and the electromagnet's pole faces is maintained throughout the life of the clutch. Thus, a strong magnetic engaging force is guaranteed regardless of the wear exhibited by the friction discs.

Another object of this invention is to provide an electromagnetic clutch in which the electromagnetic engaging force is unaffected by wearing of the torque carrying members, since the flux does not pass through the torque transmitting surfaces.

Still a further object of this invention is the provision of a unique and simplified wear adjusting means to automatically maintain the clutch armature in close contactive engagement with the electromagnet's pole faces regardless of the wear experienced by the torque transmitting members.

It is even a further object of this invention to provide an electromagnetic clutch having high torque load capacity in a clutch housing of substantially small diameter.

It is another important object of this invention to provide a multiple disc clutch with automatic wear compensating means in which it is unneccessary to ever adjust the air gap between armature and pole face since it is always maintained at or near to zero. By satisfying the requirements dictated by this object, the self-adjusting feature of the invention more than doubles the dynamic and static torque of a clutch of similar design without the self-adjusting wear compensating feature.

It is yet another object of this invention to provide a bidirectional electromagnetic clutch having new and novel wear compensating means that efficiently performs its function regardless of the direction of rotation of the clutch.

Another object of this invention is to provide a bidirectional electromagnetic clutch wherein the force applied to the disc pack is never greater than the magnetic force on the armature, but which because of the cam action of the wear compensating mechanism relieves the armature to the point of zero armature torque.

Other objects and advantages of this invention will become apparent from the following detailed description taken in conjunction with the accompanying drawing.

BRIEF DESCRIPTION OF THE DRAWING

The drawing shows a schematic cross-sectional view of my electromagnetic clutch design in which the self-adjusting mechanism is illustrated in the sectional view and in a fragmented plan view located generally along the axis of the clutch.

DETAILED DESCRIPTION OF THE PREFERRED EMBODIMENT

Referring to the drawing, my electromagnetic clutch is shown generally designated by numeral 10. The clutch includes a fixed or stationary magnet body 12 adapted to be secured to fixed mounting structure (not shown) and fabricated of magnetic flux conducting material such as iron or steel. Magnet body 12 is formed to provide an annular recess or cavity 14 within which is mounted an electromagnetic coil 16 which may be secured in the cavity by resin or other conventional means. Coil 16 has leads 18 extending radially upwardly as viewed in the drawing where they may be connected to a controlled power source or control circuit (not shown) through the connector 20.

The clutch of the present invention is reversible with respect to input and output sides and thus, clutch structure which in one installation would be an input member, in another installation would be an output member. Accordingly, rotating input and output members referred to in the following description as driving and driven means respectively, could also have been referred to generically as first and second torque transmitting members. However, for reasons of clarity in description, the generic terminology was avoided. It is important to further recognize that my clutch is designed to operate in either of two possible directions of rotation.

My clutch further includes a rotary driving member 22 which consists of three integral subparts. First, a generally-cylindrical member 24 defines the radially-inner confine of the clutch and which extends axially so that one end is concentric with the magnet body 12, but having a small but definite radial air gap 26 therebetween. Cylindrical member 24 is fabricated of magnetic flux conducting material. An annular ring 28 of nonconducting magnetic flux material such as brass or the like forms a second subpart of the driving means 22 and is integrally secured to cylindrical member 24. A third and radially outermost annular member 30 is comprised of magnetic flux conducting material and is integrally secured to the ring 28 so that the driving means 22 is a laminated member having radially inner and outer magnetic flux conducting portions and an intermediate nonflux conducting section. It will be apparent that magnetic flux is inhibited from traveling radially through the driving member 22 but may travel in a general axial direction through both the inner cylindrical member 24 and the outer annular member 30.

The driving or input member 22 has axially-extending splines 32 formed along one portion of its outer surface on which are slidably mounted a first plurality of annular friction discs 34. It will be readily understood that the spline connection fixes the first plurality of discs to the driving member rotationally while permitting relative axial movement. A second plurality of friction discs 36 are alternately disposed between adjacent discs 34 to comprise a friction clutch disc pack. Discs 36 are connected to the output or driven member 38 which has an axially-extending portion 40 having slots 42 providing an axially-slidably but rotationally-fixed connection with the discs 36. The annular member 30 extends axially to the right as viewed in the drawing of the friction disc pack, forming a reaction plate on one side of the disc pack and providing a second radial air gap 44 with the magnet body 12. The inner radial edge of annular ring 30 has a groove 46 forming a seat for the outer race of bearing 48 which in turn is supported at its inner race by sleeve 50 which is brazed or otherwise secured to magnet body 12.

The three laminated sections of the driving member 22 may be integrally secured in various conventional ways such as, for example, drilling and tapping an oversized screw hole that overlaps all three sections and inserting a screw (not shown). While a screw, if steel, would permit a small flux leakage from radially inner to radially outer segments, a certain limited amount of flux leakage can be tolerated, depending on coil and current strength and the flux gap spacing. Moreover, the nonconducting ring need not necessarily be annularly continuous, but may be comprised of a series of annularly-arranged segments interspersed with thin ribs interconnecting the radially inner and outer members just so long as adequate and operative flux strength is maintained in an axial direction.

A disc-shaped armature plate 54 is fabricated from magnetic flux conducting material and is arranged a small spaced distance from one side face of the driving member 22 (in the disengaged mode), and extends radially to overlap all three laminated segments. A plurality of pins 70, generically referred to herein as projections, are fixedly secured in a plurality of holes 55 drilled in the radially outer surface of armature 54 and extend radially upwardly from the outer periphery of armature 54. Projections 70 form a first part of the interconnecting cam means further described below.

Coaxially circumjacent to armature plate 54, there is slidably mounted an annular pressure plate 60. Pressure plate 60 extends axially to the right as viewed in the drawing of the armature 54, forming an integral pressure member for bearing against the disc pack. Pressure plate 60 has a plurality of V-shaped recesses 61 cut therein, each recess 61 adapted to coactively receive one of the projections 70, thus forming the second part of the interconnecting cam means. The symetrical V-shaped surfaces 65 provided in the recesses 61 form the cam-like inclines for operatively coacting with the armature pins 70. The pins 70 and their respective recesses 61 are spaced equi-angularly about the axis of the clutch. Pressure plate 60 has a plurality of radially extending tanges 63 which are received in the slots 42 provided in the radially extending sections 40 of the driven member 38; this connection secures pressure plate 60 to driven member 38 for rotation therewith while simultaneously allowing plate 60 to slide axially therealong.

Those skilled in the art will appreciate that although my invention specifically recites the use of pins 70 and V-shaped recesses 61, many other analogous cam-like members are known that could be used with equal effectiveness. That is, the V-shaped surfaces or inclines 65 need not be straight sided; parabolic and/or other curved surfaces could have been used, providing only that the cam surfaces 65 be generally symetrical one to the other. Thus, the "adjusted" position of the pressure plate relative to the armature will be approximately the same for both directions of clutch rotation. Projections or protuberances different from pins 70 could be formed on the outer surface of armature 54 and still successfully convert the rotary motion of armature 54 into axial motion of pressure plate 60 whenever required.

It is also important to recognize that the cam means interconnecting the armature and the pressure plate could be structurally reversed without departing from the concept of my invention. That is, the pins could be fixedly secured to the pressure plate 60 and the V-shaped recesses could be formed in the radially outer surface of armature 54 with the shape of the "V" axially reversed.

Armature 54 is resiliently restrained from axial movement relative to pressure plate 60 by a retaining ring 80 and a spring washer 81 disposed between armature 54 and retaining ring 80. Retaining ring 80 is sprung into an annular groove 57 formed in the radially inner surface of armature 54.

The pressure plate 60 and annular spacer or reactive member 62 at the opposed side of the disc pack are preferably fabricated of nonmagnetic material and installations where the discs 34 and 36 are flux-conducting metal elements to block flux leakage through the disc pack.

A plurality of tension springs 66 which resiliently interconnect the armature pressure plate assembly to the output member or driven means 38 retract the armature 54 from the driving means 22 when the clutch is de-energized. In the preferred embodiment, springs 66 are looped around the retaining ring 80 and a plurality of pins 39 provided in the radially extending portion of output member 38. Of course, many other methods for retracting the armature from the pole faces of an electromagnetic clutch are known in the art and could be used to advantage in my clutch also.

Those skilled in the art will appreciate that although my invention is shown and described for application in a disc-type clutch, it could also be applied with equal effectiveness in a cone-type clutch. That is, the plurality of discs 34 and 36 which engagingly interconnect the driving means 22 to the driven means 38, could be replaced by frustro-conically shaped torque transmitting friction members of the type shown and described in commonly assigned patent application Ser. No. 129,742 filed on even date now U.S. Pat. No. 3,679,034.

OPERATION OF THE PREFERRED EMBODIMENT

The clutch, as illustrated in the drawings, is shown in the engaged position whereby the driving and driven rotary members 22 and 38 respectively are frictionally coupled. In this condition, electrical power is supplied through leads 18 to coil 16 which generates an electromagnetic field following the path illustrated by arrows in the drawing. This flux travels in a loop through the magnet body 12, jumping the radial air gap 44, axially through the outer annular member 30 (thus, reaching past the disc pack), jumping the axial air gap between armature 54 and driving means 22 to armature plate 54. From thence, the flux travels radially inwardly of the armature plate where it again jumps the air gap between the armature and the driving means, passing through cylindrical member 24, the radial air gap 26, back to the magnetic body 12. The magnetic flux pulls the armature plate 54 into contactive engagement with the driving means 22, which is assumed to be rotating. Since the pressure plate 60 is slidably mounted to armature 54, the axial force on armature 54 is transmitted through pins 70 causing pressure plate 60 to compress the disc pack for clutch engagement. When the circuit to coil 16 is interrupted, the flux decays, permitting springs 66 to retract the armature plate 54 from the driving member 22, thus releasing the disc pack and permitting relative motion between driving and driven members.

No further axial movement by pressure plate 60 upon the outer surface of armature 54 will take place until the friction surfaces of the friction discs 34 and 36 become worn. As the friction surfaces of the friction discs wear, the armature 54, which prior to wear was relieved to the point of almost zero torque by the pressure plate 60, is caused to rotate relative to the pressure plate 60. The rotational motion of armature 54 relative to pressure plate 60 is converted by the cam means into an additional axial force on pressure plate 60. That is, as armature 54 rotates relative to pressure plate 60, the pins 70 coactively engage with inclines 65 thus imparting an additional axial force component on pressure plate 60 causing pressure plate 60 to move further to the right into engagement with the disc pack; armature 54 is thereby again relieved to the point of almost zero armature torque. Since the recesses 61 are V-shaped, i.e., one inclined surface 65 being generally symetrical with the other, pins 70 are free to move up either side of the V-shaped inclines, their coaction with respectively similar inclines being dependent on the direction of rotation of the driving means. The resilient force exerted by spring washer 81 and its coaction with retaining ring 80 maintain the adjusted position of pressure plate 60 relative to armature 54 for either direction of clutch rotation.

In the engaged position, armature 54 remains in close contactive engagement with the driving means 22 and little or no air gap between these members is allowed to develop while simultaneously almost all torque transferred between the driving means and the driven means is carried by the disc pack. The axial force imposed on the pressure plate 60 opposes and is nearly equal to the magnetic force on the armature 54; the axial force is not equal to the magnetic force because of the friction between the inclines 65 and pins 70. Therefore, there will always be some torque developed between the armature and the driving member 22 which slightly reduces the force on the disc pack. However, the slight reduction in the axial force on the disc pack is more than compensated by the minute or zero air gap which permits a much higher than normal magnetic axial force therefore resulting in a higher net torque.

While only one embodiment of the invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

I claim:

1. In combination with an electromagnetic clutch of the type having a plurality of torque transmitting friction members adapted for releasably coupling bidirectional driving means to bidirectional driven means, and wherein pressure is exerted on said friction members by a flux permeable disc-shaped armature's response to a magnetic force created by electromagnetic actuating means, the improvement comprising:

two-way self-adjusting wear compensating means, said wear compensating means including an annular pressure plate member axially movable to selectively engage and disengage said friction members, said pressure plate being coaxially circumjacent to said armature; and cam means interconnecting said pressure plate and said armature to transmit first axial motion therebetween when said actuating means is energized, said cam means adapted to convert rotational motion of said armature into second axial motion of said pressure plate as the torque transmitting friction members wear, said cam means being operative in either direction of clutch rotation.

2. The combination as claimed in claim 1 wherein said cam means comprises:

a plurality of recesses formed within said pressure plate; and a plurality of projections protruding from said armature adapted to coactively engage with said recesses within said pressure plate.

3. The combination as claimed in claim 2 wherein said recesses within said pressure plate are V-shaped.

4. The combination as claimed in claim 3 wherein said projections are cylindrical pins fixedly secured in the radially outer surface of said armature and slidably received within said recesses of said pressure plate for relative rotation and coaction therewith.

5. The combination as claimed in claim 1 including further means for resiliently restraining axial movement of said armature relative to said pressure plate.

6. The combination as claimed in claim 1 wherein the electromagnetic actuating means comprises a magnet body disposed about said driving means and an electromagnetic winding disposed within said magnet body.

7. The combination as claimed in claim 1 including further clutch disengagement means, said disengagement means including a plurality of springs interconnecting said armature-pressure plate assembly to said driven rotary member and adapted to exert an axial load on the armature opposite in direction to the electromagnetic engaging force.

* * * * *